Nov. 5, 1963     A. H. PINKE     3,109,567
ROTATABLE AND REMOVABLE SUPPLY TUBE AND DISCHARGE
HOSE FOR SPRAYERS AND THE LIKE
Filed Jan. 12, 1962
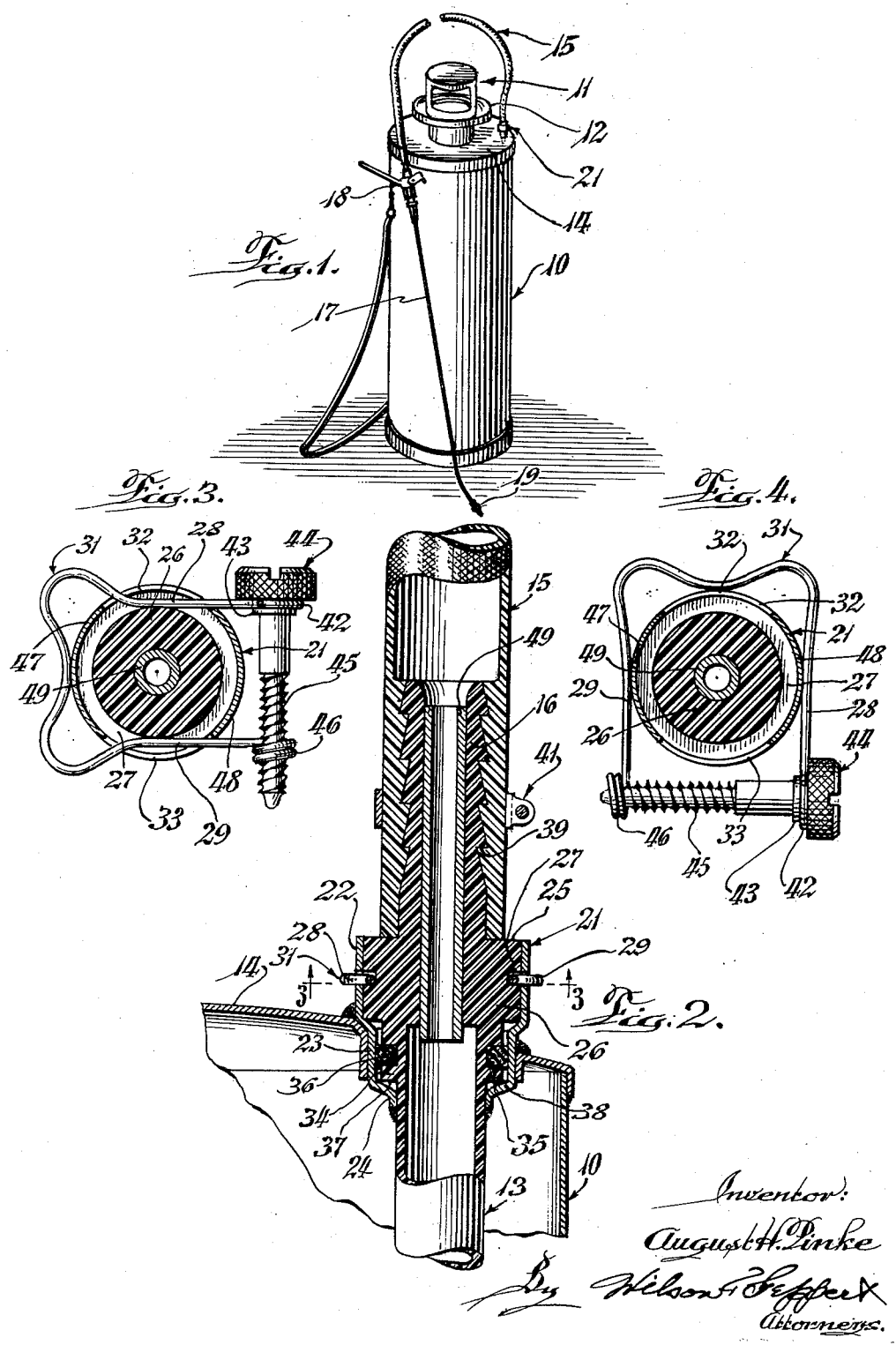

3,109,567
ROTATABLE AND REMOVABLE SUPPLY TUBE AND DISCHARGE HOSE FOR SPRAYERS AND THE LIKE

August H. Pinke, Hastings, Minn., assignor to H. D. Hudson Manufacturing Company, Chicago, Ill., a corporation of Minnesota
Filed Jan. 12, 1962, Ser. No. 165,734
7 Claims. (Cl. 222—464)

The present invention relates to a novel assembly including a supply tube depending into a spray tank, a flexible discharge hose affixed to the supply tube, and connecting means for detachably and rotatably mounting and sealing the supply tube and its connected flexible hose in a ferrule or bushing in the tank.

Sprayers of the type shown in the illustrative embodiment comprise a tank for receiving a spray solution of suitable formulation such as a pesticide, insecticide, agricultural, commercial or industrial chemical, etc., means for generating pressure in the tank for dispensing the spray solution upwardly through a supply tube in the tank with its lower end extending to adjacent the bottom of the tank for discharge of the contained spray solution, and a flexible discharge hose connected to the projecting outer end of the supply tube, the discharge hose being provided with a discharge nozzle and valve means for controlling the discharge and, in the present novel embodiment, the supply tube and discharge hose comprise a unit assembly detachably and rotatably mounted in a ferrule or bushing affixed to the tank.

The conventional forms of commercial sprayers embody a discharge tube depending into and rigidly and permanently affixed to the tank, and an external flexible discharge hose securely clamped to the exposed upper end of the fixed discharge tube. Such prior assemblies have numerous objections including (1) the discharge hose cannot turn or swivel and is thus subject to kinking, (2) the discharge hose is not readily removable for cleaning, (3) the supply tube is not removable but fixed preventing the operator or user from effectively cleaning its passage for the spray solution, (4) the tank cannot be effectively drained of any residual spray solution, and (5) since the discharge hose and the supply tube cannot turn or swivel relative to the tank, the latter is readily tipped over as the operator moves about in spraying with resulting damage to the discharge hose and the projecting end of the supply tube to which the hose is connected.

These various objections to and problems encountered in the conventional type of sprayers are solved in the present assembly where the discharge hose and its supply tube are free to rotate or swivel relative to the tank.

It is, therefore, an important object of the present invention to provide a novel combination of a supply tube projecting into and rotatably and detachably mounted in the tank for the passage of the spray solution under pressure from the tank and a connected discharge hose for discharge of the spray solution through the hose and its nozzle from which the operator directs the spray solution by means controlling the discharge and pattern of the issuing spray. This novel rotatable connection avoids any undue strain on either the discharge hose or the supply tube.

In the novel embodiment, both the supply tube and the discharge hose are rotatably mounted as a unit in a ferrule or bushing in the upper portion of the tank and may be quickly and bodily removed for effective cleaning of these parts of any contained residue. Furthermore, upon such removal the tank may be upended and effectively drained through the opening of the ferrule of any spray solution remaining in the tank.

Another important object of the present invention is the provision of a novel means and manner of detachably and removably mounting and sealing the supply tube in the tank to which is affixed the external flexible discharge hose with its spray extension, nozzle and spray control valve for controlling the droplet size and pattern of the discharged spray solution.

Further objects are to provide a construction of maximum simplicity, efficiency, economy and ease of assembly and operation, and such further objects, advantages and capabilities as will later more fully appear and are inherently possessed thereby.

In the drawing:

FIGURE 1 is a perspective view of a sprayer embodying the novel assembly of the combination supply tube, discharge hose and its connected discharge nozzle and valve control, and the means for detachably and removably mounting the upper or outer end of the supply tube in the tank.

FIG. 2 is a fragmentary enlarged view in vertical cross section showing in detail the novel means and manner of detachably and removably mounting the outer or upper end of the supply tube in a ferrule or bushing in the tank.

FIG. 3 is a view in horizontal cross section taken on the line 3—3 of FIG. 2 and showing the spring retaining means anchored in position for connecting the supply tube to the fixed ferrule of the tank.

FIG. 4 is a view similar to FIG. 3 but with the spring retainer in release position when rotated through an arc of approximately 90° from that shown in FIG. 3, in which position the discharge hose and the supply tube may be readily withdrawn.

Referring to the disclosure in the drawing in which is shown an illustrative embodiment of the present invention in a compression sprayer, the sprayer assembly therein shown includes a tank or container 10 for receiving the spray solution to be dispensed, a pump 11 mounted in the fill opening of the funnel top 12 of the spray tank, a supply tube 13 projecting through the top 14 of the tank and which supply tube depends into the tank to adjacent the bottom thereof where the spray solution enters and passes upwardly in the supply tube under air pressure generated in the tank by manipulation of the pump, a flexible discharge hose 15 connected to the upper or outer extended end 16 of the supply tube 13, and a spray extension 17 to be grasped by the operator for directing the spray and having a valve 18 at one end for controlling flow of the spray solution and an adjustable nozzle 19 at the other or outer end for ultimate discharge of the spray solution in a desired spray pattern.

In the present invention, the upper end 16 of the supply tube 13 is rotatably and removably mounted in a metal ferrule or bushing 21 rigidly affixed in an opening in the top 14 of the tank 10. This ferrule 21 has decreasing stepped formation 22, 23 and 24 conformably receiving a stepped enlargement 25 adjacent the upper end 16 of the supply tube 13 with an enlarged portion 26 having an outwardly opening annular groove 27 for receiving the spaced legs 28 and 29 of a retaining clip 31, these legs (FIGS. 3 and 4) being adapted to project through opposed slots 32 and 33 in the upper stepped portion 22 of the ferrule 21. The lower enlarged portion 34 of the enlargement 25 of the supply tube 13 is also provided with an outwardly opening annular groove 35 receiving a gasket or O-ring 36 having continuous sealing engagement with the interior of the intermediate stepped formation 23 of the ferrule 21. When the annular groove 27 is aligned with the opposed slots 32 and 33 in the cylindrical ferrule 21, the shoulder 37 at the base of the enlarged portion 27 abuts or seats upon the inturned reduction 38 of the ferrule to thereby facilitate accurate alignment of the enlargement 25 in the ferrule 21.

The reduced upper end or projection 16 of the supply tube 13 is serrated at 39 to receive thereon the adjoining end of the flexible discharge hose 15. While this forms a tight connection therebetween, a screw connected clamping collar 41 may also be provided about this end of the hose 15 to assure retention regardless of the pressure generated in the tank 10.

The retaining clip 31 is a substantially U-shaped flexible wire provided with the spaced legs 28 and 29 the end of the leg 28 being bent to provide a loop 42 adapted to conformably receive an annular shoulder 43 on the shank of a retaining screw 44, the threaded end 45 of the screw being received in a looped end 46 on the other leg 29 of the retaining clip 31. When the retaining clip 31 is moved to the position shown in FIG. 3 with the legs 28 and 29 projecting through the opposed slots 32 and 33 in the ferrule and into the annular groove 27 and the screw 44 is tightened, the supply tube 13 is held against longitudinal movement or withdrawal from the ferrule 21 and tank 10, but the supply tube 13 and its discharge hose 15 are free to rotate or swivel relative to the tank 10.

When the supply tube 13 is to be withdrawn with its connected flexible hose 15, the screw 44 is loosened sufficiently to permit the retaining clip 31 to be grasped and rotated through an arc of approximately 90° to the position shown in FIG. 4. In this latter position, the legs 28 and 29 of the clip 31 are spread or cammed apart by rotating engagement with the connecting portions 47 and 48 spanning the opposed, vertically aligned slots 32 and 33 in the ferrule 21. This cams and retains spread the legs 28 and 29 and releases the retaining clip 31 from the annular groove 27 in the enlarged portion 26 of and permits withdrawal of the suppply tube 13 and its connected discharge hose 15.

The supply tube 13 is preferably formed of a suitable plastic or other composition having sufficient rigidity and unaffected by the spray solution contained in the tank 10. To reinforce the upper extension 16 of the supply tube 13, there is provided a suitable length of metal tubing 49 in the flow passage or bore of this tube. As such metal must be unaffected by the spray solution, such reinforcing tubing is preferably of stainless steel.

From the above disclosure, it will be apparent that the present invention comprehends a novel removable and rotatably mounted supply tube 13 which may be bodily removed for cleaning or replacement and which when mounted in operative position in the ferrule 21, is free to turn with its connected discharge hose 15 relative to the ferrule and tank and so as to be free from kinking. When the supply tube 13 is removed, any remaining spray solution may be quickly drained from the tank.

Having thus disclosed the invention, I claim:

1. In a sprayer comprising a tank containing a spray solution and provided with a discharge opening, the combination comprising a slotted ferrule mounted in said opening, a supply tube mounted in and projecting through said ferrule with the lower end of said tube projecting to adjacent the bottom of the tank for receiving the spray solution to be dispensed, means for rotatably and removably mounting the upper end of said tube in said ferrule with the upper end of said tube projecting upwardly through said ferrule, a discharge hose connected to the upper end of said tube, and a part on said tube conformably received in said ferrule and having means for sealing contact with the interior of said ferrule, said first mentioned means comprising a retaining clip on said ferrule and having spaced legs adapted to project through said slots and engage the part on said supply tube received in said ferrule.

2. In a sprayer as set forth in claim 1, in which the part on said supply tube received within the ferrule is provided with longitudinally spaced, outwardly opening annular grooves, one of which grooves receives the legs of the retaining clip and the other an O-ring having continuous sealing contact with the internal wall of the ferrule.

3. In a sprayer assembly including a tank for a spray solution having a discharge opening, the combination comprising a slotted bushing mounted in said opening, a supply tube projecting through said bushing and having its lower depending end extending to adjacent the bottom of the tank for receiving spray solution, its upper end projecting upwardly beyond the bushing and below said upper end having an enlargement conformably received in the bushing, a flexible discharge hose affixed to the upper end of the supply tube, and means for rotatably and removably mounting the supply tube in said bushing comprising an annular groove in said enlargement on the supply tube and retaining means carried by said bushing and having projections adapted to extend through the slots in said bushing into said annular groove in said enlargement whereby said supply tube and said discharge hose are free to rotate.

4. In a sprayer assembly as set forth in claim 3, in which said enlargement carries a gasket having sealing contact with the interior of the bushing.

5. In a sprayer assembly as set forth in claim 3, in which the enlargement on the supply tube is provided with a second annular groove longitudinally spaced from the first mentioned groove in which is provided a sealing ring having sealing contact with the interior of said bushing.

6. In a sprayer assembly including a tank for a spray solution having a discharge opening, the combination comprising a bushing mounted in said opening, a supply tube projecting through said bushing and having its lower depending end extending to adjacent the bottom of the tank for receiving spray solution, its upper end projecting upwardly beyond the bushing and below said upper end having an enlargement conformably received in the bushing, a flexible discharge hose affixed to the upper end of the supply tube, and retaining means for rotatably and removably mounting the supply tube in said bushing whereby said supply tube and said discharge hose are free to rotate, said retaining means comprising a substantially U-shaped resilient clip having spaced legs, circumferentially spaced slots in the bushing and an annular outwardly opening groove in said enlargement adapted to receive said legs when aligned with said slots through which the legs project.

7. In a sprayer assembly as set forth in claim 6, in which each leg is provided with a loop at its projecting end and a screw mounted in one of said loops with its threaded end adapted to be received in the other loop for applying retaining pressure to said legs.

References Cited in the file of this patent

UNITED STATES PATENTS

| | | |
|---|---|---|
| 2,723,056 | Smith | Nov. 8, 1955 |
| 3,042,117 | Sievert | July 3, 1962 |